(No Model.) 3 Sheets—Sheet 1.
C. SCHMID.
VALVE MECHANISM FOR STEAM ENGINES.
No. 551,049. Patented Dec. 10, 1895.
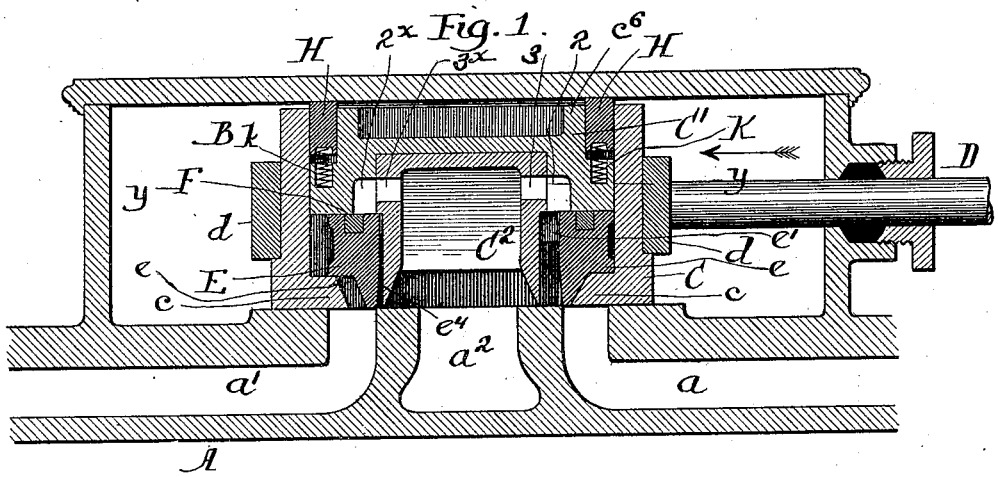
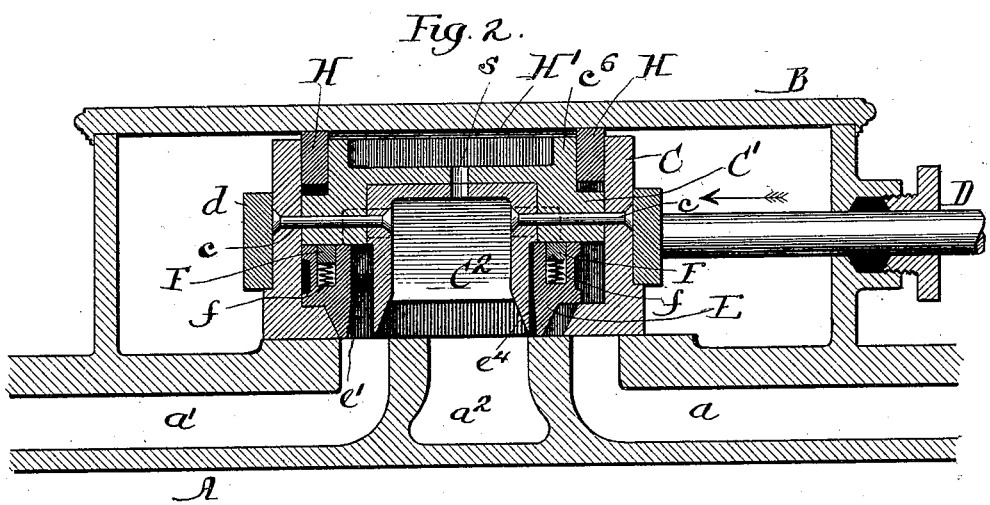

(No Model.) 3 Sheets—Sheet 2.

C. SCHMID.
VALVE MECHANISM FOR STEAM ENGINES.

No. 551,049. Patented Dec. 10, 1895.

Witnesses:
Fred Gerlach
J. P. Carpenter

Inventor:
Chas. Schmid
By Pine Fisher
Attorneys.

(No Model.) 3 Sheets—Sheet 3.
C. SCHMID.
VALVE MECHANISM FOR STEAM ENGINES.
No. 551,049. Patented Dec. 10, 1895.
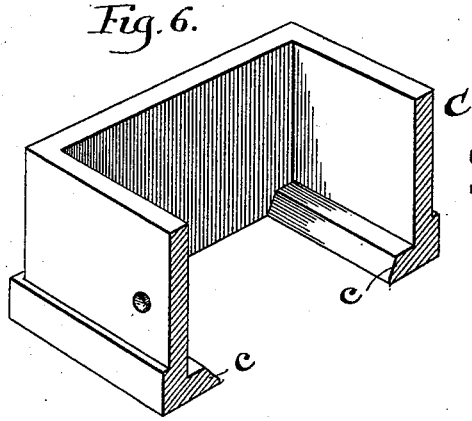
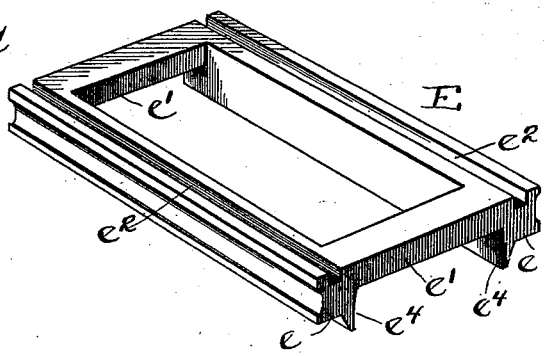
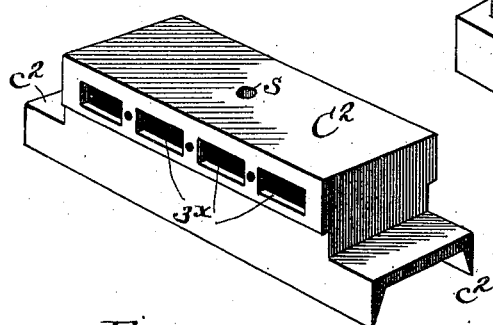
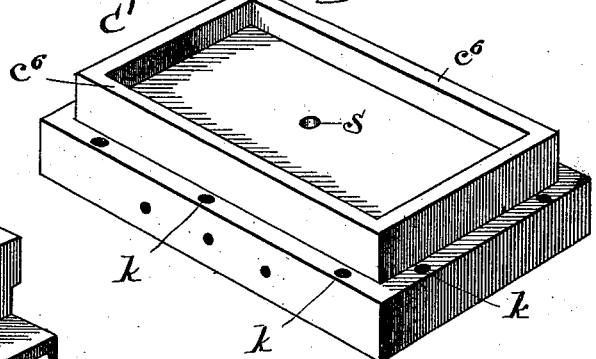
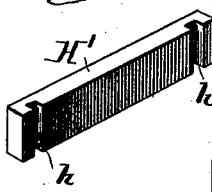
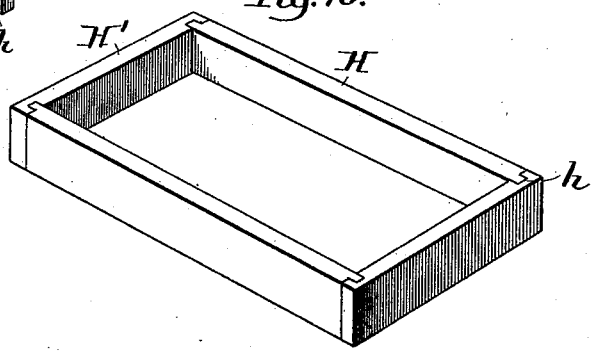
Witnesses:
Fred Gerlach
J. P. Carpenter
Inventor:
Chas. Schmid
By Price & Fisher
Attorneys

UNITED STATES PATENT OFFICE.

CHARLES SCHMID, OF CHICAGO, ILLINOIS, ASSIGNOR TO THE AMERICAN VALVE AND GOVERNOR COMPANY, OF SAME PLACE.

VALVE MECHANISM FOR STEAM-ENGINES.

SPECIFICATION forming part of Letters Patent No. 551,049, dated December 10, 1895.

Application filed June 27, 1892. Serial No. 438,159. (No model.)

*To all whom it may concern:*

Be it known that I, CHARLES SCHMID, a citizen of the United States, residing at Chicago, in the county of Cook and State of Illinois, have invented certain new and useful Improvements in Valve Mechanism for Steam-Engines, of which I do declare the following to be a full, clear, and exact description, reference being had to the accompanying drawings, forming part of this specification.

My present invention has relation to that class of valve mechanism for steam-engines wherein provision is made for lessening the back pressure or resistance upon the exhaust side of the piston, so that the loss of energy and consequent increase in working cost incident to such resistance will be avoided. Examples of this type of valve mechanism are illustrated in Letters Patent Nos. 337,441 and 347,012, granted to myself and George Farnsworth March 9, 1886, and August 10, 1886, respectively.

My present invention consists in the novel features of construction hereinafter described, illustrated in the accompanying drawings, and particularly pointed out in the claims at the end of this specification.

Figure 3:
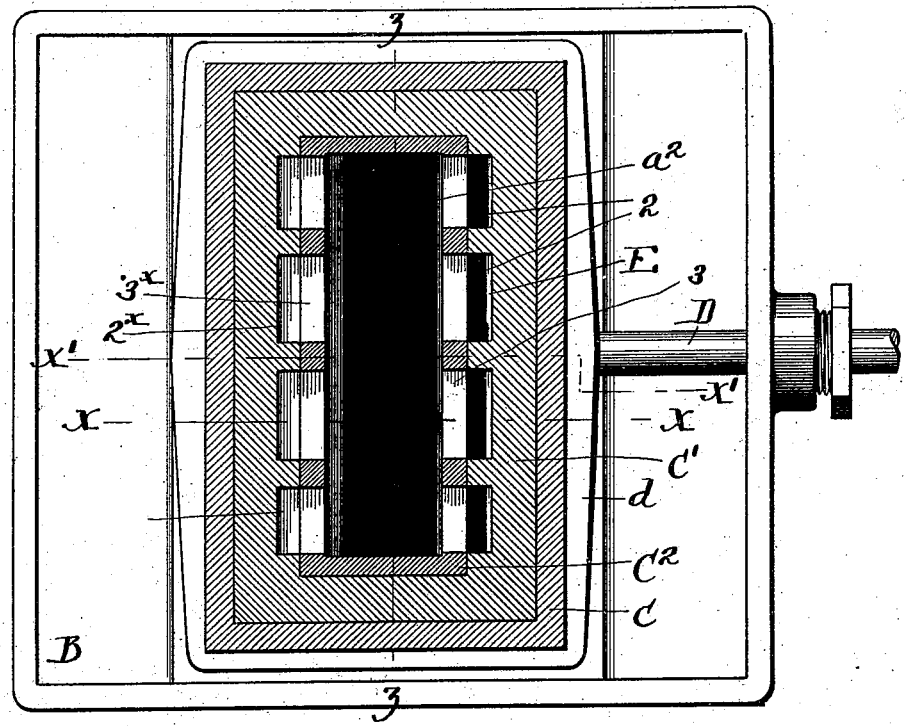
Figure 4:
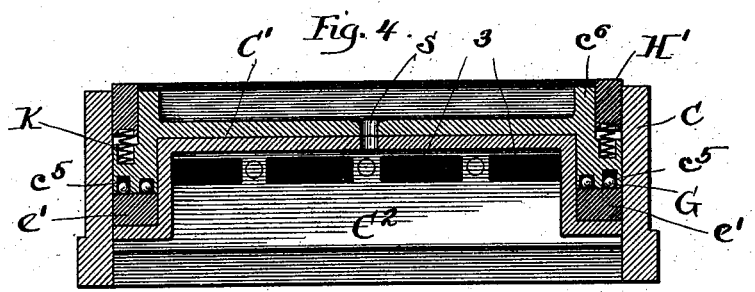
Figure 5:
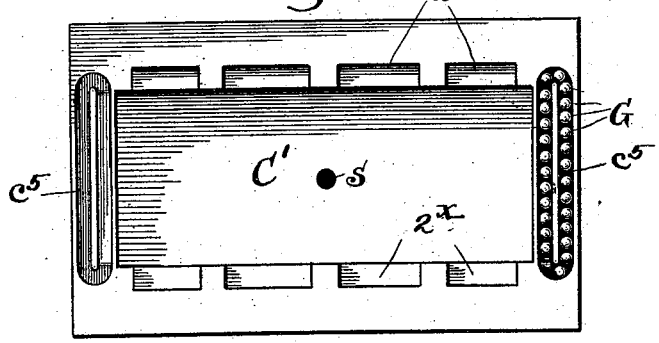

Figure 1 is a view in central longitudinal section on the line $x\ x$ of Fig. 3. Fig. 2 is a view similar to Fig. 1, but on line $x'\ x'$, and showing the parts in different position. Fig. 3 is a view in horizontal section on line $y\ y$ of Fig. 1. Fig. 4 is a view in vertical cross-section on line $z\ z$ of Fig. 3. Fig. 5 is an inverted detail plan view of the main-valve cover. Fig. 6 is a perspective view showing a portion of the main valve. Fig. 7 is a detail perspective view of the supplemental valve by which the escape of the exhaust-steam is controlled. Fig. 8 is a detail perspective view of the cavity-plate of the main valve. Fig. 9 is a detail perspective view of the cover-plate of the main valve. Fig. 10 is a detail perspective view of the balance-bars of the main valve. Fig. 11 is a detail perspective view of one of the balance-bars shown in Fig. 10.

A designates the cylinder, and B the steam-chest, of the engine, the cylinder being provided with the usual steamways $a$ and $a'$ and the exhaust-port $a^2$. Within the steam-chest and upon an appropriate seat is placed the main slide-valve, the body C of which is operated in the usual manner by a valve-rod D, the yoke $d$ of which embraces the valve. Preferably the main slide-valve is formed of the body C, the cover-plate C', and the cavity-plate or exhaust-chamber $C^2$, these parts being united together by through-bolts $c$ at convenient points. (See Fig. 2.) In the bottom portion of the cover-plate C' are formed the escape-channels 2 and $2^\times$, of convenient size and number, with which will coincide the escape-ports 3 and $3^\times$, formed in the side walls of the cavity-plate $C^2$ above the reduced portion of this plate.

When the several parts of the main slide-valve are bolted together in position for use, as shown in the drawings, there is formed a space between the lower part of the cavity-plate $C^2$ and the main body C of the slide-valve, within which space is placed the supplemental valve E, that serves to control the steam channels and ports 2 and 3 and $2^\times$ and $3^\times$, as will presently appear. The lower part of the body C of the main valve is formed with shoulders $c$, whereon will rest the shoulders $e$ of the supplemental valve E, the end bars $e'$ of this supplemental valve resting upon the extended ends $c^2$ of the cavity-plate $C^2$. The upper edge of the supplemental valve E bears upon the lower edge of the cover-plate C', and in order to secure a steam-tight joint between these bearing parts I prefer to form the channels $e^2$ in the upper face of the supplemental valve, within which channels will be placed the packing-bars F, that are forced normally upward into bearing against the cover-plate C' by means of suitable springs $f$, also placed within the channels. Although the supplemental valve E is described as a single valve, because it is preferably formed as a single casting, as shown—that is to say, with its sides connected by the end bars $e'$—still in effect this supplemental valve is two valves, since one side of this valve controls the steam channels and ports 2 and 3 upon one side of the exhaust-cavity, while the opposite side of the supplemental valve controls the corresponding channels and ports $2^\times$ and $3^\times$ upon the opposite side of the exhaust-cavity of the main slide-valve. I do not wish my invention to be understood, however, as restricted to a single supplemental valve formed as shown, since manifestly this valve may be formed as two separate valves without departing from the spirit of the invention.

It will be observed that while the supplemental valve E encircles the cavity-plate $C^2$ of the main valve it is considerably larger than this cavity-plate, the purpose of this construction being to permit this supplemental valve to be shifted in order to enable it to properly control the escape ports and channels 2 and 3 and $2^\times$ and $3^\times$, as will presently appear. As the shifting of the supplemental valve is to be effected by the exhaust-steam, I prefer to slightly bevel the inner face of the supplemental valve, as shown at $e^4$, to permit the exhaust-steam to readily enter between this valve and the lower outer face of the cavity-plate $C^2$, although it is obvious that a like result could be obtained by beveling the outer face of the cavity-plate opposite the lower part of the supplemental valve.

From the foregoing description the operation of my improved valve mechanism as thus far defined will be seen to be as follows: When the parts are in the relative positions seen in Fig. 1 of the drawings, the valve moving in the direction of the arrow shown in such figure, steam has been admitted to the steam-port $a'$ of the cylinder and has been cut off and the main valve has moved to such position that the release of the steam through such port $a'$ is about to occur. As the movement of the main valve continues, the force of the expanding steam within the steam port or way $a'$ will pass between the supplemental valve E and the lower wall of the cavity-plate $C^2$, thereby instantly shifting the supplemental valve from the position seen in Fig. 1 to the position seen in Fig. 2 and permitting a free release of the steam through the escape channels and ports $2^\times$ and $3^\times$, and thence through the exhaust-port $a^2$. As the movement of the main slide-valve continues, as seen in Fig. 2 of the drawings, the direct release of the steam is also permitted over the bridge-wall between the steam way or port $a'$ and the exhaust-port $a^2$. Manifestly if the supplemental valve E were not present at the time the parts of the main slide-valve are in the position illustrated in Fig. 1 of the drawings, or if such supplemental valve E were in the position shown in Fig. 2 of the drawings, the release of the steam would occur much sooner; but inasmuch as the supplemental valve E must be shifted before a release of the steam can occur the release of the steam is delayed, and consequently the expansive force of the steam is utilized as long as possible, while a complete and quick release of the steam at the proper time is secured. In other words, the supplemental valve when in the position seen in Fig. 1 of the drawings operates to give the desired extent of "inside lap" for retaining the steam while operating expansively upon one side of the piston, while that part of the supplemental valve E upon the opposite side of the main valve is in such position that it cannot interfere with the free escape of the steam from the exhaust side of the piston. After the valve has been moved in the direction of the arrows, Figs. 1 and 2, to such extent as to permit the admission of steam to the cylinder through the steam port or way $a$ the free escape of the steam from the exhaust side of the cylinder will occur through the steam way or port $a'$ to the exhaust-port $a^2$, directly over the bridge-wall, and also indirectly through the channels and ports $2^\times$ and $3^\times$, and this free escape of the exhaust-steam will continue until motion of the valve has been reversed and the inner edge of the supplemental valve passes onto the bridge-wall between the steam port or way $a'$ and the exhaust-port $a^2$, at which time the escape of the exhaust-steam will be cut off, leaving sufficient exhaust-steam within the cylinder to cushion the piston. About the time that this cut-off of the exhaust thus occurs the main valve, with the supplemental valve in the relative position seen in Fig. 2 of the drawings, will have moved in a direction reverse of the arrows shown in Fig. 2 of such drawings until the inner edge of the supplemental valve E has come over the steam-port $a$, thereby allowing the steam within such steam port or way $a$ to instantly shift the supplemental valve to the position seen in Fig. 1 of the drawings and insure a quick release of the steam. Hence it will be seen that with my improved valve a release of the steam is delayed as long as desired, while at the same time a free escape of the steam from the exhaust side of the cylinder is secured, and as a consequence I obtain the benefit incident to the employment of an inside lap, while the back-pressure ordinarily due to the use of such lap is avoided.

In order to insure an easy movement of the supplemental valve E with respect to the main slide-valve, I prefer to form the bottom edge of the end portions of the cover-plate $C'$ of the main valve with channels $c^5$ to receive the friction rolls or balls G, these balls serving as bearings for the upper edge of the supplemental valve. Preferably the channels $c^5$ are formed of varying depth, so as to insure the movement of the balls G in the channels.

In order to balance the valve, I prefer to form the cover-plate $C'$ with a flange $c^6$, extending around the top thereof, and between this flange and the upper part of the body C of the main valve I place the balance-bars H and H', which fit snugly in the space between the flange $c^6$ of the cover-plate and the upper walls of the main body C of the valve and are held normally against the inner face of the steam-chest cover by means of suitable springs K, that rest within seats $k$ in the cover-plate $C'$. Preferably the balance-bars H and H' are connected together as illustrated in Fig. 10 of the drawings—that is to say, the bars H have reduced ends which enter seats $h$, formed in the bars $h'$. By this arrangement a slight play of the bars is permitted to compensate for wear. The cover-plate $C'$ and cavity-plate $C^2$ are perforated, as shown at $s$, to permit any water of condensation to escape from above the valve into the exhaust-port $a^2$ of the cylinder.

It is manifest that the details of construction above set out can be widely varied without departing from the spirit of my invention, and to such details, therefore, I do not wish the invention to be understood as restricted.

Having thus described my invention, what I claim as new, and desire to secure by Letters Patent, is—

1. In valve mechanism for steam engines, the combination with a main slide valve having exhaust ports therein leading to the exhaust cavity, of a supplemental valve for controlling said exhaust ports, said supplemental valve being arranged in position to be actuated by the steam from the cylinder, substantially as described.

2. In valve mechanism, the combination with a main chambered valve having an exhaust cavity, of a supplemental valve located between the walls of the exhaust cavity and the body of the valve, and escape ports or channels leading into the exhaust cavity and controlled by said supplemental valve, substantially as described.

3. In valve mechanism, the combination with a main valve having an exhaust cavity and having escape ports or channels leading into said exhaust cavity, of a supplemental valve for controlling said escape ports located within the space around said exhaust cavity, substantially as described.

4. In valve mechanism, the combination with a main valve having an exhaust cavity, and having escape ports or channels in the wall of said exhaust cavity, of a supplemental valve for controlling the escape of steam through said ports or channels, said supplemental valve being arranged on each side of said exhaust cavity, and having the lower part of its abutting face separated at a distance from the wall of the cavity, to permit the access of steam to shift the supplemental valve, substantially as described.

5. In valve mechanism the combination of a main valve having an exhaust cavity, the wall of which extends to the valve seat and is provided with ports, and having a space outside the wall of said exhaust cavity for the passage of steam, and a supplemental valve arranged within said space and adapted to control the passage of exhaust steam, substantially as described.

6. In valve mechanism, the combination of a main chambered valve having an exhaust cavity and having ports or channels leading through the walls of said exhaust cavity, of a supplemental valve located within said main valve, said supplemental valve being provided with spring seated packing bars, substantially as described.

7. In valve mechanism, the combination of a main valve consisting of a body $C$, a cover plate $C'$ and a cavity plate $C^2$ provided with suitable escape ports or channels, and a supplemental valve $E$ located between said cavity plate and the main body of the valve for controlling the passage of exhaust steam through said ports or channels, substantially as described.

8. In valve mechanism, the combination with the main valve, of a shifting supplemental valve located within the main valve and having a broad face opposed to a fixed portion of said main valve whereby the shifting of said supplemental valve by the steam may be effected, substantially as described.

9. In valve mechanism, the combination with the main valve, having an exhaust cavity, and having at its base an inwardly extending shoulder, of a supplemental valve extending on each side of the walls of said exhaust cavity and having a laterally extending shoulder adapted to rest upon the inwardly extending shoulder of the main valve, substantially as described.

CHARLES SCHMID.

Witnesses:
 FRED GERLACH,
 I. B. CARPENTER.